United States Patent [19]

McElroy

[11] Patent Number: 4,533,424

[45] Date of Patent: Aug. 6, 1985

[54] PIPE FUSION APPARATUS WITH LOAD CELL FOR ATTACHING SIDE WALL FITTINGS

[75] Inventor: Arthur H. McElroy, Tulsa, Okla.

[73] Assignee: McElroy Manufacturing, Inc., Tulsa, Okla.

[21] Appl. No.: 570,389

[22] Filed: Jan. 13, 1984

[51] Int. Cl.³ .................... B29C 17/00; B29C 27/00; B29D 31/00; B29F 5/00

[52] U.S. Cl. ................. 156/378; 156/379.8; 156/499; 269/41; 425/170; 425/517

[58] Field of Search ............. 425/517, 170; 156/158, 156/304.2, 304.6, 499, 378, 379.8, 516; 269/41

[56] References Cited

U.S. PATENT DOCUMENTS

| | | | |
|---|---|---|---|
| 3,616,024 | 10/1971 | Windle | 156/304.8 |
| 3,729,360 | 4/1973 | McElroy | 156/499 |
| 3,743,566 | 7/1973 | Louthan et al. | 269/41 |
| 3,846,208 | 11/1974 | McElroy | 219/228 |
| 4,338,712 | 7/1982 | Dearman | 269/41 |
| 4,352,708 | 10/1982 | McElroy | 156/378 |
| 4,445,677 | 5/1984 | Hansen et al. | 269/41 |

Primary Examiner—Willard E. Hoag
Attorney, Agent, or Firm—Head, Johnson & Stevenson

[57] ABSTRACT

A portable pipe fusion apparatus for attaching plastic side wall fittings e.g. tees, branch saddles to a plastic pipe of selected composition. This apparatus comprises a base plate with means to rigidly clamp the base plate to a pipe main. Two parallel, spaced support rods attached to the base plate at one end, and to a support plate across the other two ends. Movable clamp means guided to slide along the support rods with the axis of movement intersecting the axis of the pipe main. The movable clamp means is adapted to be attached to and hold various of the side wall fittings rigidly, so that the axes of the fittings intersect the axis of the main pipe. Drive screw means held in a quick release split nut means on the support plate, will force the movable clamp in the direction to contact the transverse pipe main. A hydraulic load cell is interposed between the drive screw and the movable clamp with an indicator which continually reads the force being applied between the moving clamp and the pipe main.

6 Claims, 3 Drawing Figures

PIPE FUSION APPARATUS WITH LOAD CELL FOR ATTACHING SIDE WALL FITTINGS

CROSS-REFERENCE TO RELATED PATENT

This invention is related to my U.S. Pat. No. 3,846,208, issued Nov. 5, 1974 and entitled: "Combination Pipe Fusion Unit". U.S. Pat. No. 3,846,208, is entered by reference into this application.

This invention is also related to my U.S. Pat. No. 4,352,708 issued Oct. 5, 1982 and entitled: "Defined Force Fusion Machine for Joining Plastic Pipe". U.S. Pat. No. 4,352,708 is entered by reference into this application.

BACKGROUND OF THE INVENTION

This invention lies in the field of thermal joining of plastic pipe such as polyolefin. More particularly, it is concerned with a combination apparatus for fusing side wall plastic fittings to the walls of a pipe main.

It is well known in the art of joining plastic pipe and the like by facing the butt end of two pipes, heating the ends to a selected temperature until they become molten, and then pressing the two ends together. This will make a longitudinal joint which is as strong as the original pipe. It is also well known that the facing ends of the two pipes must be heated to a specific temperature and be pressed together with a selected force in order to make a perfect joint. Consequently, it is logical that there should be a force measuring means associated with any apparatus for joining two plastic pipe elements.

Furthermore, in the joining of smaller pipes to large pipes various sizes of sidewall fittings are required. Molded plastic fittings are available on the market, for attachment to main pipes of various medium and large diameters. Since the diameters and wall thicknesses of these attachments and pipes will vary considerably it is important to know what the force is at any moment between the two butting portions of the fitting and the main pipe.

Therefore, particularly for the assembly of sidewall fittings the force of application is critical. Although the strength of a man's arm forcing the two pipes together by means of a lever can be judged approximately, a precise representation of the force is desirable. This application provides a simplified portable apparatus for fusion of sidewall fitting, and provides a direct reading force gauge, that will precisely indicate the force being used at any instant to press the two parts together.

SUMMARY OF THE INVENTION

It is a primary object of this invention to provide a fusion apparatus for attachment of small plastic sidewall fittings to a larger plastic pipe, and to provide a load cell interposed between the force application point and a movable member to indicate the true total force between the fitting and the pipe.

It is a further object of this invention to provide a small lightweight portable fusion apparatus that can be rigidly attached to large pipes already in a ditch.

These and other objects are realized and the limitations of the prior art are overcome in this invention by providing a simple lightweight portable apparatus that can be attached to a larger pipe main, and be clamped rigidly to the main, while a sidewall fitting is attached by fusion to the wall of the pipe.

The apparatus comprises a small metal C-shaped base plate assembly with a seat for the pipe main along one central dimension of the base plate. Suitable chain clamp means to rigidly hold the fusion apparatus to the pipe main is provided on the base plate.

There are two support rods spaced apart and parallel which are attached to the base plate on the opposite side of the base plate from the main pipe. The outer end of the rods are held by a support plate that holds them precisely spaced apart so that the rods are parallel, and are in a plane which passes through the axis of the pipe main. A cross-head is adapted to slide freely along the two support rods. This cross head holds a "movable" pipe clamp which is part of the cross-head, with its axis in the plane of the two support rods.

At the outer end of the support rods the support plate provides a central opening parallel to the rods for a drive screw of substantial length. This drive screw has a knob for turning it, and is held by a split nut arrangement on the support plate.

Supported on top of the movable cross-head and clamp is a load cell. This is a small metal body having a central cavity. It is mounted centrally on top of the cross-bar, with its central axis colinear with the drive screw. A cylindrical bore is made along the axis of the body, and finished as a hydraulic cylinder. A small hydraulic piston is adapted to slide sealably in and out of the cylinder. A pressure gauge is attached to the load cell with its inlet pipe screwed into the wall of the body, contacting the internal cavity of the load cell. Means are provided for filling the cavity so that as the drive screw is screwed down, pushing the piston into the cylinder, the hydrostatic pressure inside of the cavity will increase, and will force the cross-bar or movable clamp in the direction of the main pipe.

Mechanical means are provided which are well known and are not described, but would be well understood in the art, for holding a sidewall fixture in the movable clamp in a concentric manner. Thus, as the cross-head with the movable clamp moves downwardly the pressure of the sidewall fixture against the pipe will be increased, and the exact force with which they are being pressed together is indicated by the scale of the pressure gauge. Knowing the area of the piston, of course, the hydraulic pressure in the fluid can be converted to total force, by multiplying by the area of the piston. Thus the flow meter can be recalibrated in terms of force, rather than pressure.

A test program will provide information as to what force should be for optimum joining for each of a plurality of different size fittings. Thus, all that is necessary is to clean the base of the fitting and the wall of the main pipe, put a heater between surfaces of the fitting and the main pipe, and when they have reached the proper melt, the heater is removed, the drive screw is driven downward, forcing the load cell against the movable clamp and the fitting tightly against the pipe main, with a force indicated by the gauge on the load cell.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Before explaining in detail the present invention, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Figure 1:
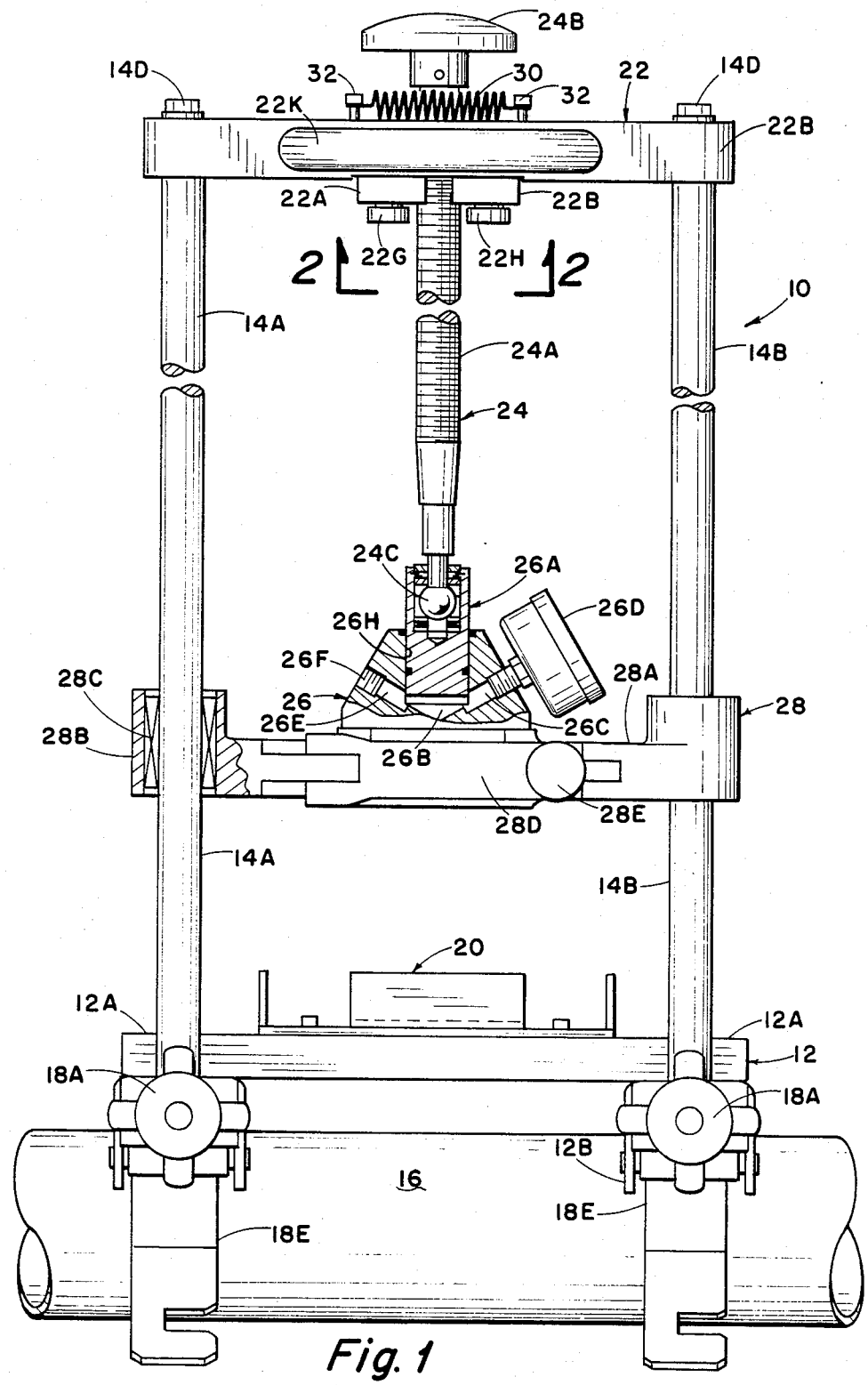
FIG. 1 is a front elevation of the fusion device.
Figure 3:
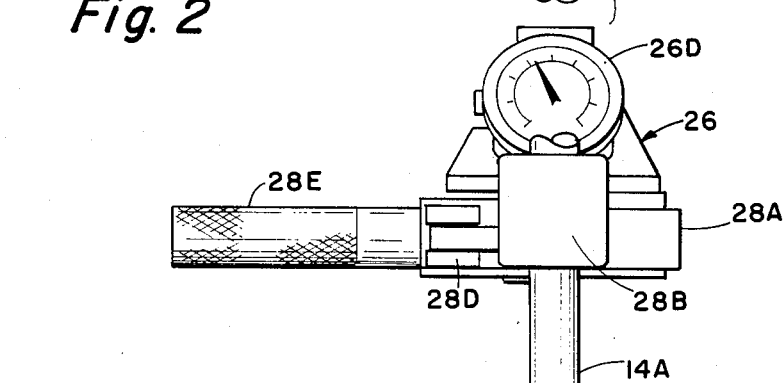
FIG. 3 is a side elevation of the apparatus of FIG. 1.
Figure 3:
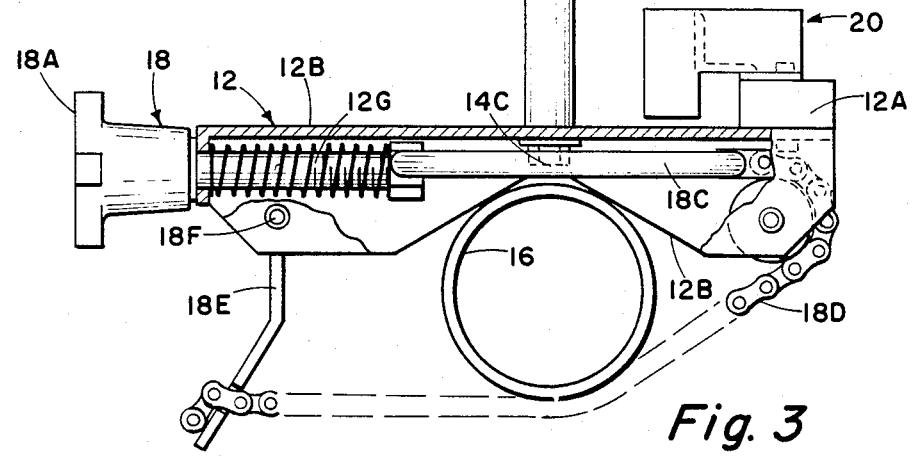

Referring now to the drawings there is shown in FIGS. 1 and 3 two views of one embodiment of this invention indicated generally by the numeral 10. It comprises a base plate, indicated generally by the numeral 12. The base plate has two spaced apart U-channels with the arms notched at 12B to hold the main pipe. There are two chains 18D which can be wrapped around the pipe 16 held in a V notch in the arms 12B of the two channels formed as a part below the base plate 12. A cross-bar (12A) is attached to the back end of the channels. Heater guide (20) is provided for various heaters to precisely align them so that the melt pattern is established in the proper position on the main. Screw and nut means 12G, 18A are provided for tightening the chain which binds the baseplate to the pipe. By the position of the V notch 12B the axis of the pipe 16 will be in a selected plane perpendicular to the base plate.

Two support rods 14A and 14B are attached to the base plate 12 by means of bolts 14C attaching them to the U channels. At the outer (upper) ends of the support rods 14A, 14B is a support plate 22, to which the end of the support rods are fastened by means of axial bolts 14D. Thus, the base plate, support rods, and support plate form a planar structure which is substantially rigid and is aligned such that the plane of the support structure will pass through the axis of the main pipe 16 supported under the base plate.

Supported intermediate between the base plate and the top support plate 22 is a cross head 28, which has roller bushings 28C in fittings 28B at each end. The cross head will slide freely along the full length of the support rods. The drive screw 24 has a spherical knob 24C on its end which fits into a cavity 26B in the end of a piston such that the drive screw 24 can rotate freely about the axis of the piston, and can at the same time, exert a force of compression onto the piston 26A or to provide a tensile force on to the piston.

A load cell 26 which has a small body in the shape which for convenience, is a truncated cone. It is attached to the cross head 28 which forms the movable clamp, which includes a conventional pipe clamping device 28D, such that the axis of the pipe or fitting to be clamped in the movable clamp will be colinear with the drive screw and will lie within the plane of the two support rods.

Beside the cylinder 26H into which the piston 26A fits, which is coaxial with the load cell, there are two openings into the central cavity. One 26C is for the insertion of a fluid pressure gauge, and another opening 26E which is used for filling the cavity 26B with a selected fluid. After the cavity has been filled and the plug 26F inserted into the filling opening, pressing the piston into the cylinder will increase the compression of the liquid in the cylinder and cavity, and the hydrostatic pressure then will be shown on the face of the pressure gauge 26D.

If it is known precisely what the cross-sectional area of the piston is, then the hydrostatic pressure multiplied by the area of the piston will give total force. For example, with pressure in pounds per square inch, and area in square inches of the piston, will cause the pressure gauge to move and it will indicate the hydrostatic pressure in the cavity which can then be converted directly to force in pounds between the fitting and the pipe. Of course, the face of the gauge can be calibrated in pounds of force.

In U.S. Pat. No. 4,352,708, which is inserted by reference into this application, a larger model of a pipe fusion device which is a combination of butt joining and sidewall joining device, is fully illustrated and described in the patent. Also shown in the patent are the details of a fusion apparatus in which there are a fixed clamp and a movable clamp which can be moved apart or together in order to carry through the process. Before the ends of the pipe can be joined they must be faced and there are on the market conventional facing devices which rotate with respect to the two pipe ends held in the clamps and cut their faces to be truly perpendicular to the axes of the two pipes which are held coaxial by the pipe clamps.

The movable clamp which is mounted on the cross bar 28 can be conventional and, for example, can be similar to FIG. 3 of U.S. Pat. No. 4,352,708. Thus, it is not necessary to describe this further since different designers would vary the small. differences between them. Thus, FIG. 3 can conveniently be used as an example of one embodiment of the movable clamp.

Also, the method of clamping the cross pipe 122 in FIG. 7 with the V notch and the chains is similar to the method of fastening the device of this invention to the main pipe. Further detail of the chain clamping device is not required.

Figure 2:
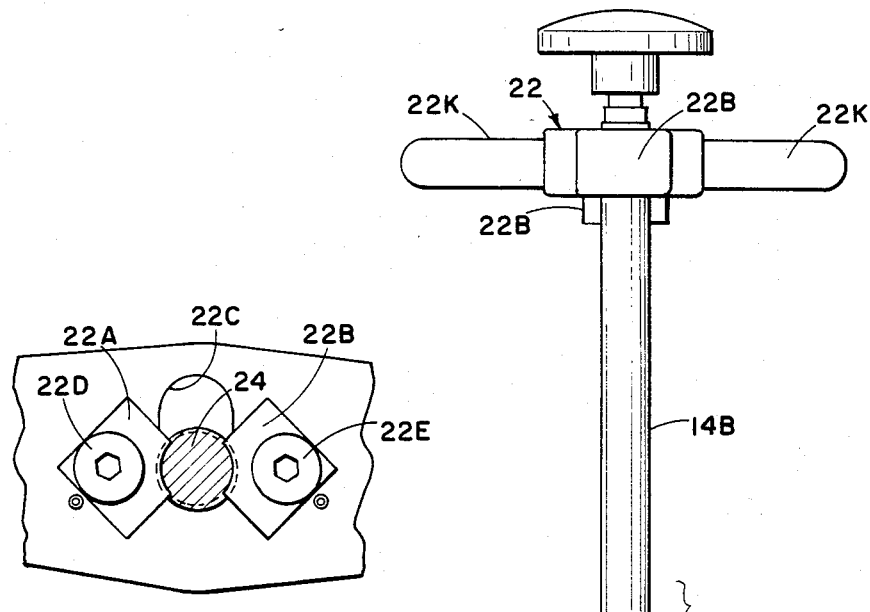
FIG. 2 shows a detail of the split nut arrangement on the support plate by means of which the drive screw can be thrown out of contact quickly to rapidly release the force which is being applied between the fitting and the pipe.

FIG. 2 is shown as a view of FIG. 1 taken along the plane 2—2. The drive screw 24 is held between the two threaded surfaces of the split nuts 22A, 22B, which are held by screws, 22D and 22E. By turning the nut 22B clockwise and 22A counter-clockwise, the drive screw will be forced into the open area of the oral opening 22C and be free of the threads. This will remove the force of the drive screw on the movable clamp.

In FIG. 1 spring 30 attached between two screws 32, is mounted on the longitudinal center line of the support plate. In this position it is used to assist in the movement of the drive screw from, or to, the split nut.

Since the base plate is a C shaped frame, the top surface of the pipe 16 is free and clear inside the C frame. Thus the drive screw, movable clamp, and pipe or fitting, held in the movable clamp, can be moved down into contact with the pipe 16.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. In apparatus having means for heating and joining plastic sidewall fittings to a plastic pipe main; the improvement comprising:
   (a) a base plate with means to rigidly clamp said base plate to a pipe main;
   (b) at least two parallel spaced support rods attached to said base plate at a selected angle; the axis of said support rods intersecting the axis of said pipe main;
   (c) movable clamp means by said fitting guided to slide along said support rods; the axis of movement of said movable clamp means intersecting the axis of said pipe main;
   (d) said support rods at their free ends attached to and guided by a support plate; said support plate at a selected distance from said base plate, and supporting an engageable thread means;
   (e) threaded drive screw means passing perpendicularly through said support plate and said engageable thread means; the axis of said drive screw intersecting the axis of said pipe main; means to rotate said drive screw;
   (f) load cell means attached at a first part to said movable clamp means; and means to attach one end of said drive screw means to a second part on said load cell; and
   (g) means associated with said load cell to indicate at any selected time, the force exerted by said drive screw on said load cell.

2. The apparatus as in claim 1 in which said load cell comprises:
   (a) a body attachable to said movable clamp means;
   (b) a bored opening or cylinder, with its axis coaxial with said drive screw means, and a piston sealably reciprocable in said cylinder;
   (c) a fluid filled cavity inside said body, said cavity open to said cylinder and to a fluid pressure gauge attached to the wall of said cavity; and
   (d) means on the end of said piston and on the end of said drive screw to provide relative rotation.

3. The appparatus of claim 1 wherein said one end of said drive screw is pivotally attached to said second part of said load cell.

4. The apparatus as in claim 3 and including means to pivot and disengage said drive screw means away from said engageable thread means to quickly move the movable clamp along its movement axis.

5. The apparatus of claim 4 wherein said engageable thread means comprises a pair of pivotal partially threaded nuts, and a spring means normally biasing said drive screw into engagement with said nuts.

6. The apparatus as in claim 5 wherein the cross-sectional area of said cylinder is substantially one square inch.

* * * * *